(12) United States Patent
Kim et al.

(10) Patent No.: US 12,460,868 B2
(45) Date of Patent: Nov. 4, 2025

(54) INDIRECT EVAPORATIVE COOLING APPARATUS AND COOLING SYSTEM INCLUDING THE SAME

(71) Applicant: KOREA INSTITUTE OF MACHINERY & MATERIALS, Daejeon (KR)

(72) Inventors: Jungchul Kim, Daejeon (KR); Dong Ho Kim, Sejong-si (KR); Seok Ho Yoon, Daejeon (KR); Young Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 489 days.

(21) Appl. No.: 18/071,891

(22) Filed: Nov. 30, 2022

(65) Prior Publication Data
US 2023/0168042 A1    Jun. 1, 2023

(30) Foreign Application Priority Data
Nov. 30, 2021    (KR) ........................ 10-2021-0169235

(51) Int. Cl.
*F28D 5/02* (2006.01)
*F28D 1/03* (2006.01)
*F28F 3/08* (2006.01)
*F28F 25/10* (2006.01)

(52) U.S. Cl.
CPC ............. *F28D 5/02* (2013.01); *F28D 1/0366* (2013.01); *F28F 3/08* (2013.01); *F28F 25/10* (2013.01); *F28F 2245/02* (2013.01); *F28F 2245/04* (2013.01)

(58) Field of Classification Search
CPC ..... F24F 5/0014; F24F 5/0035; F28D 1/0366; F28D 5/00; F28D 5/02; F28F 3/08; F28F 25/10; F28F 2245/02; F28F 2245/04
See application file for complete search history.

(56) References Cited

U.S. PATENT DOCUMENTS

| 2010/0018234 A1* | 1/2010 | Gillan | F24F 1/0007 |
| | | | 62/304 |
| 2012/0047937 A1* | 3/2012 | Cass | F28F 21/067 |
| | | | 62/316 |

(Continued)

FOREIGN PATENT DOCUMENTS

| KR | 20210128525 A | * | 10/2021 | |
| WO | WO-2015123665 A1 | * | 8/2015 | ......... B01D 53/1425 |

OTHER PUBLICATIONS

Machine translation of KR 20210128525 (Year: 2025).*

*Primary Examiner* — Eric S Ruppert
*Assistant Examiner* — Hans R Weiland
(74) *Attorney, Agent, or Firm* — Hauptman Ham, LLP (57) ABSTRACT

The present disclosure relates to an indirect evaporative cooling apparatus and a cooling system including the same, and more particularly, to an indirect evaporative cooling apparatus including a plurality of evaporation modules each including a first module and a second module, and a cooling system including the same. According to the present disclosure, it is possible to provide an indirect evaporative cooling device that maximizes cooling efficiency and space efficiency, and a cooling system including the same.

20 Claims, 5 Drawing Sheets

(56) References Cited

U.S. PATENT DOCUMENTS

| | | | |
|---|---|---|---|
| 2012/0125581 A1* | 5/2012 | Allen | F28F 3/10 |
| | | | 156/291 |
| 2013/0340449 A1* | 12/2013 | Kozubal | F24F 3/147 |
| | | | 62/271 |
| 2017/0276383 A1* | 9/2017 | Gilbert | F28D 5/00 |

* cited by examiner

INDIRECT EVAPORATIVE COOLING APPARATUS AND COOLING SYSTEM INCLUDING THE SAME

CROSS REFERENCE TO RELATED APPLICATION

The present application claims priority to Korea Patent Application No. 10-2021-0169235, filed Nov. 30, 2021, the entire contents of which is incorporated herein for all purposes by this reference.

BACKGROUND

Field

The present disclosure relates to an indirect evaporative cooling apparatus and a cooling system including the same, and more particularly, to an indirect evaporative cooling apparatus including a plurality of evaporation modules each including a first module and a second module, and a cooling system including the same.

Description of the Related Art

In general, an evaporative cooling apparatus is a cooling apparatus using the latent heat of evaporation of a refrigerant, which cools surrounding air by absorbing heat equivalent to the heat of vaporization from the surrounding air when the refrigerant evaporates. Such an evaporative cooling apparatus is eco-friendly because the evaporative cooling apparatus has higher energy efficiency than a general air conditioner using a refrigeration cycle consisting of a compressor, a condenser, an expander and an evaporator, and is economical because of its simple configuration.

An evaporative cooling apparatus is largely divided into a direct evaporative cooling apparatus and an indirect evaporative cooling apparatus. In addition, water is mainly used as a refrigerant.

The direct evaporative cooling apparatus is an evaporative cooling apparatus in which a cooling target fluid to be cooled is in direct contact with the refrigerant to evaporate the coolant. The direct evaporative cooling apparatus has a very simple configuration, achieving quick cooling. However, as the refrigerant evaporates in the cooling target fluid, there is a problem in that the humidity of the cooling target fluid increases. In addition, when the cooling target fluid is already humid, there is a problem that evaporation cannot be smoothly performed.

Unlike the direct evaporative cooling apparatus, the indirect evaporative cooling apparatus is an evaporative cooling apparatus in which the cooling target fluid does not come into contact with the refrigerant. Specifically, working fluid is in contact with the refrigerant to evaporate the refrigerant and is then cooled and the cooling target fluid is cooled by heat exchange with the cooled working fluid. Unlike the direct evaporative cooling apparatus, the indirect evaporative cooling apparatus has the advantage of providing a more comfortable environment to a user because there is no change in humidity or the like even when cooling has been performed.

However, even in the case of the indirect evaporative cooling apparatus, there is a problem in that the cooling efficiency is lowered because the heat transfer efficiency between the working fluid and the cooling target fluid is low. In addition, since sufficient space is required to inject a refrigerant such as water to working fluid, the space efficiency of the apparatus decreases, and production and installation costs also unnecessarily increase.

SUMMARY

Based on the above technical background, the present disclosure provides an indirect evaporative cooling apparatus that maximizes cooling efficiency and space efficiency in the indirect evaporative cooling apparatus, and a cooling system including the same.

According to an embodiment of the present disclosure, an indirect evaporative cooling apparatus includes a plurality of evaporation modules each of which comprises a first module and a second module disposed to face the first module, wherein each of the first module and the second module includes a heat transfer plate, a hydrophobic plate, a water supply device. Heat transfer may be made in the heat transfer plate. The hydrophilic plate may be disposed to face the heat transfer plate and formed of a porous material capable of absorbing water. The hydrophobic plate may be disposed to face the hydrophilic plate on an opposite side of the heat transfer plate and have pores, working fluid flowing through the hydrophobic plate on a side opposite to a side facing the hydrophilic plate. The water supply device may supply water to the hydrophilic plate. In each of the evaporation modules, a first flow path through which the working fluid flows may be formed between the first module and the second module, and a second flow path through which a cooling target fluid flows may be formed between two of the evaporation modules adjacent to each other.

Further, in each of the evaporation modules, the hydrophobic plate of the first module and the hydrophobic plate of the second module may be disposed to face each other, and the heat transfer plate of the first module and the heat transfer plate of the second module may be respectively disposed at outermost sides of the evaporation module.

Further, in each of the evaporation modules, the first module and the second module may be disposed to be spaced apart from each other.

Further, the first module and the second module are arranged to be spaced apart from each other by a water supply device of the first module and a water supply device of the second module.

Further, the water supply device of the first module may be configured to support at least one of the heat transfer plates, the hydrophilic plate, and the hydrophobic plate of the first module, the water supply device of the second module may be configured to support at least one of the heat transfer plates, the hydrophilic plate and the hydrophobic plate, and the water supply device of the first module and the water supply device of the second module may be stacked on each other.

Further, in each of the evaporation modules, the water supply device of the first module and the water supply device of the second module each may include a water supply member having a water supply flow path formed therein. The hydrophilic plate of the first module may be exposed to the water supply flow path of the first module, and the hydrophilic plate of the second module may be exposed to the water supply flow path of the second module. The hydrophobic plate of the first module may be spaced apart from the water supply flow path of the first module, and the hydrophobic plate of the second module may be spaced apart from the water supply flow path of the second module.

Further, each of the hydrophilic plates may include protrusion formed in the each hydrophilic plate and protruding toward the water supply flow path.

Further, the water supply member of the first module and the water supply member of the second module may be stacked on each other, and the water supply flow path of the first module and the water supply flow path of the second module may communicate with each other.

Further, each of the plurality of first modules and the plurality of second modules may further comprise a mesh member which is disposed to face the hydrophobic plate on an opposite side of the heat transfer plate, and through which the working fluid is able to pass. Further, a leak prevention member may be provided between the mesh member adjacent thereto and the hydrophobic plate.

Further, the first flow path and the second flow path may be formed in directions crossing each other.

Further, a plurality of pattern protrusions may be formed on a surface of each of the plurality of hydrophilic plates.

Further, a maximum radius (r) of the pores of the hydrophobic plate satisfies equation $r \leq 2\sigma/\rho gH$, where $\sigma$ is a surface tension coefficient of water, $\rho$ is a density of water, g is an acceleration of gravity, H is a height of the cooling apparatus.

Further, when the height (H) of the cooling apparatus is fixed, as the lower a position of the hydrophobic plate, the smaller the radius (r) of the pores of the hydrophobic plate.

Further, the working fluid is air, and the outlet of the first flow path may communicate with an outdoor space, and the cooling target fluid is water or air, and an inlet and an outlet of the second flow path may communicate with an indoor space.

Further, a portion of indoor air may be introduced into the second flow path, and a remaining portion of the indoor air may be introduced to the first flow path.

Further, indoor air may flow through the second flow path, and at least a portion of the indoor air discharged from the second flow path may be introduced to the first flow path.

According to an embodiment of the present disclosure, an indirect evaporative cooling system includes the cooling apparatus according to the embodiment of the present disclosure, a first pipe, a second pipe, a third pipe, and a fourth pipe. The first pipe may have an inlet communicating with an outdoor space and an outlet communicating with an inlet of the first flow path. The second pipe may have an inlet communicating with an indoor space and an outlet communicating with an inlet of the second flow path. The third pipe may have an inlet communicating with an outlet of the second flow path, and an outlet communicating with an indoor space. A fourth pipe may have an inlet communicating with the outlet of the first flow path, and an outlet communicating with the outdoor space.

Further, the first pipe may include a 1-1-th pipe having an inlet communicating with the outdoor space, and a 1-2-th pipe having an outlet communicating with the inlet of the first flow path. The second pipe may be connected to a bypass pipe that branches a portion of a fluid. A first switching apparatus may be disposed between an outlet of the 1-1-th pipe, an inlet of the 1-2-th pipe, and the bypass pipe and the first switching apparatus may selectively communicate the 1-2-th pipe with the 1-1-th pipe or the bypass pipe.

Further, the first pipe may include a 1-1-th pipe having an inlet communicating with the outdoor space, and a 1-2-th pipe having an outlet communicating with the inlet of the first flow path, and the third pipe may be connected to a bypass pipe that branches a portion of a fluid. A second switching apparatus may be disposed between an outlet of the 1-1-th pipe, an inlet of the 1-2-th pipe, and the bypass pipe, and the second switching apparatus may selectively communicate the 1-2-th pipe with the 1-1-th pipe or the bypass pipe.

The indirect evaporative cooling apparatus and the cooling system including the same according to the present disclosure can maximize cooling efficiency and space efficiency by including a plurality of evaporation modules each including a first module and a second module.

DETAILED DESCRIPTION

Advantages and features of the present disclosure, and a method of achieving them will become apparent with reference to the embodiments described below in detail in conjunction with the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The present disclosure is just defined by the scope of the appended claims Like reference numerals refer to like elements throughout.

Hereinafter, an indirect evaporative cooling apparatus 1000 and a cooling system including the same according to the present disclosure will be described with reference to the accompanying drawings.

Figure 1:
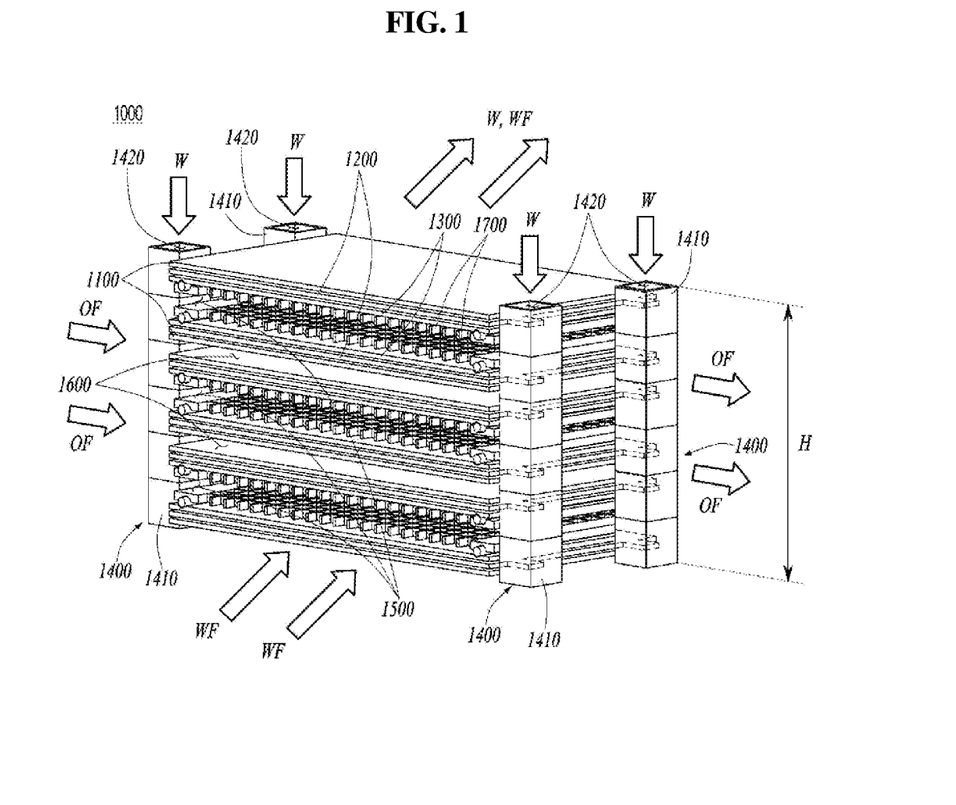
FIG. 1 is a perspective view showing an indirect evaporative cooling apparatus according to a first embodiment of the present disclosure.
Figure 2:
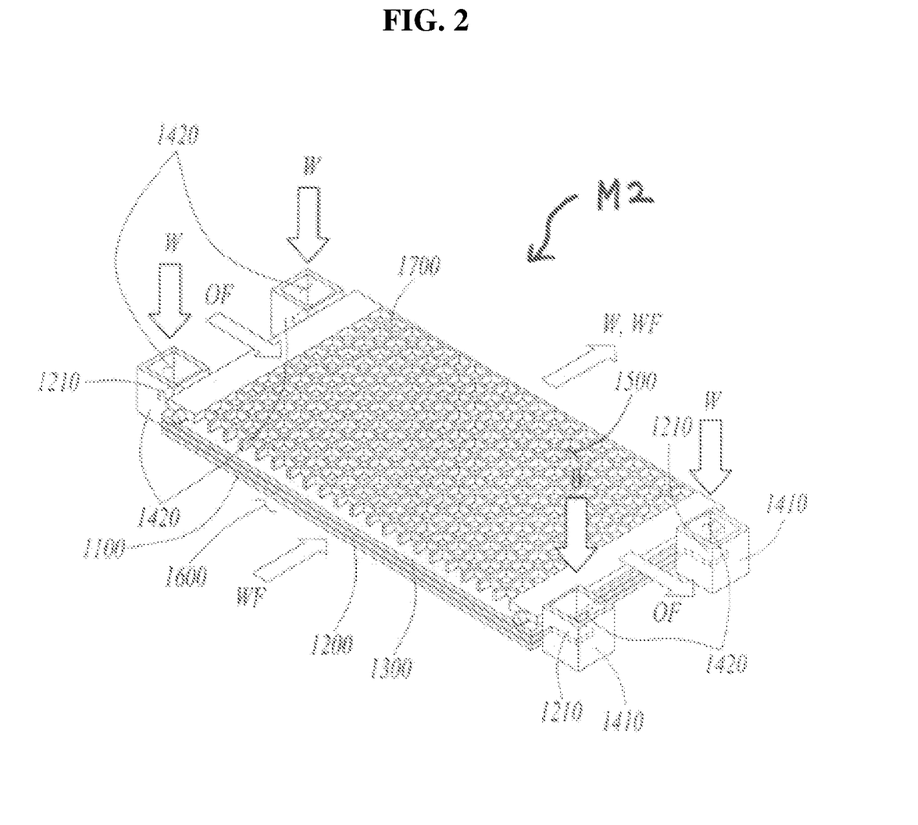
FIG. 2 is an enlarged perspective view of a second module in FIG. 1.
Figure 3:
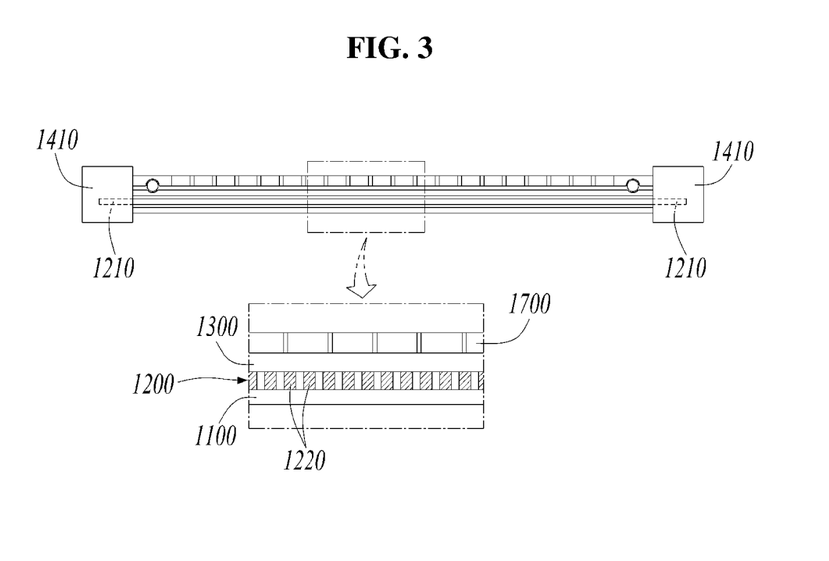
FIG. 3 is a view showing a hydrophilic plate formed in a hydrophilic pattern in the indirect evaporative cooling device according to the first embodiment of the present disclosure.
Figure 4:
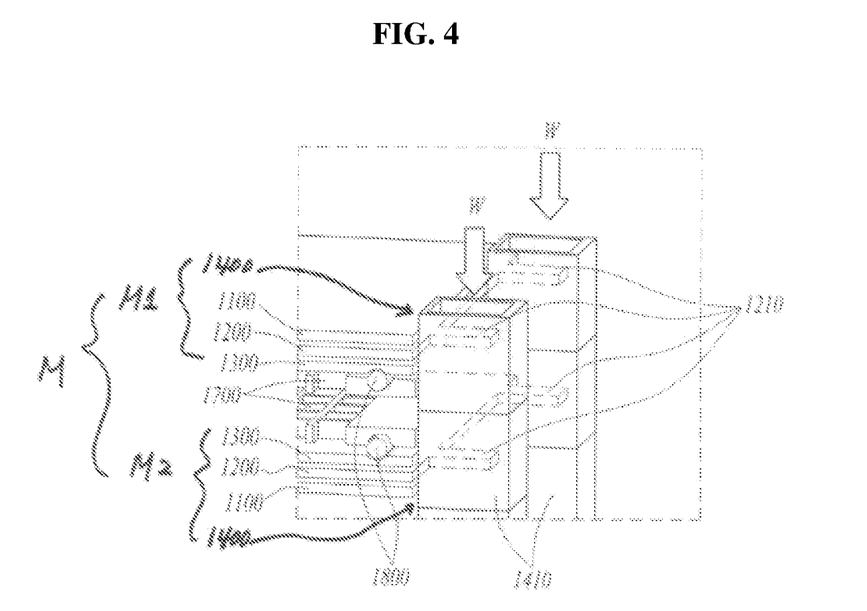
FIG. 4 is an enlarged view of a water supply member in FIG. 1.
Figure 5:
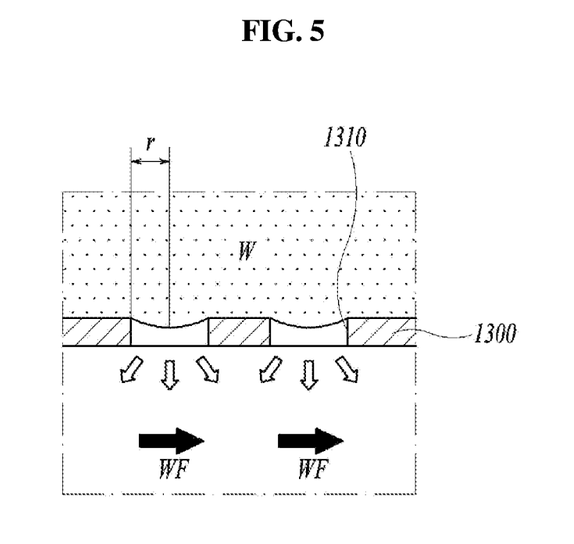
FIG. 5 is an enlarged view of the pores of the hydrophobic plate of the indirect evaporative cooling apparatus according to the first embodiment of the present disclosure.
Figure 6:
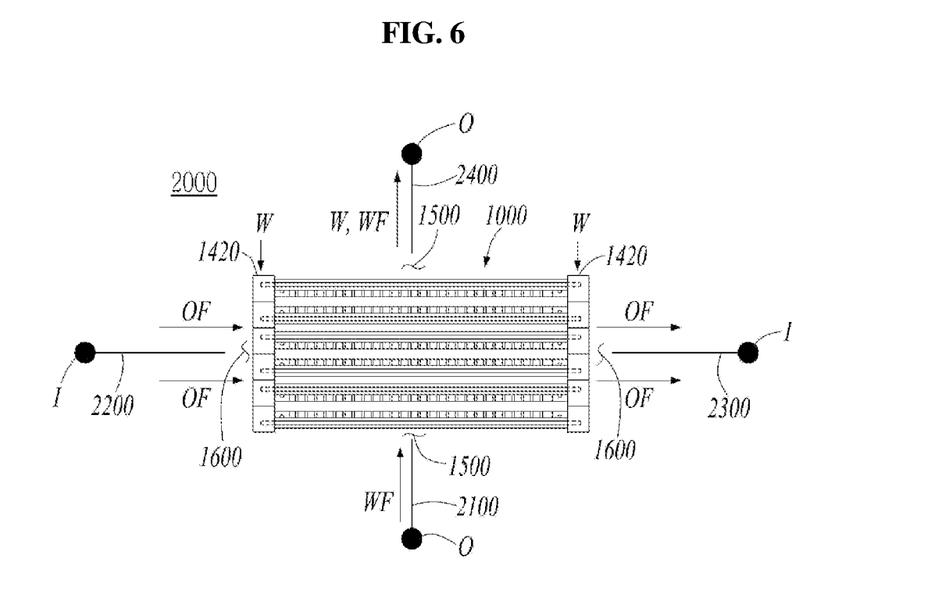
FIG. 6 is a conceptual diagram illustrating the indirect evaporative cooling apparatus according to the first embodiment of the present disclosure and a cooling system including the same.

FIG. 1 is a perspective view showing an indirect evaporative cooling apparatus according to a first embodiment of the present disclosure, FIG. 2 is an enlarged perspective view of a second module in FIG. 1, FIG. 3 is a view showing a hydrophilic plate formed in a hydrophilic pattern in the indirect evaporative cooling apparatus according to the first embodiment of the present disclosure, FIG. 4 is an enlarged view of a water supply member in FIG. 1, FIG. 5 is an enlarged view of the pores of the hydrophobic plate of the indirect evaporative cooling apparatus according to the first embodiment of the present disclosure, and FIG. 6 is a conceptual diagram illustrating the indirect evaporative cooling apparatus according to the first embodiment of the present disclosure and a cooling system including the same.

Referring to FIGS. 1 to 5, an indirect evaporative cooling apparatus 1000 according to a first embodiment of the present disclosure will be described in detail. The indirect evaporative cooling apparatus 1000 according to the first embodiment of the present disclosure may include a plurality of evaporation modules M. Each evaporation module M may include a first module M1 and a second module M2. Each of the first module M1 and the second module M2 may include a heat transfer plate 1100, a hydrophilic plate 1200, a hydrophobic plate 1300, and a water supply device 1400.

Heat is transferred through the heat transfer plate 1100. The heat transfer plate 1100 may be formed in a plate shape, and may be formed of a metal material having excellent thermal conductivity.

The hydrophilic plate 1200 is disposed on the heat transfer plate 1100. The hydrophilic plate 1200 is disposed to face the heat transfer plate 1100. The hydrophilic plate 1200 may be disposed in close contact with the heat transfer plate 1100. The hydrophilic plate 1200 may be formed of a material that is both hydrophilic and porous. Due to this, the hydrophilic plate 1200 may absorb water W or the like. The hydrophilic plate 1200 may be formed of a membrane material, and may be provided in the form of a film or a sheet and disposed on the heat transfer plate 1100. Alternatively, the hydrophilic plate 1200 may be manufactured by coating a hydrophilic material on the heat transfer plate 1100. In this case, since the hydrophilic plate 1200 can be formed to have a thin thickness, thermal conductivity to the heat transfer plate 1100 may be improved.

The hydrophilic plate 1200 may be formed to have a hydrophilic pattern. In this case, a plurality of pattern protrusions 1220 may be formed on the surface of the hydrophilic plate 1200. Water W and the like may be absorbed between the plurality of pattern protrusions 1220.

The hydrophobic plate 1300 is disposed on the hydrophilic plate 1200. The hydrophobic plate 1300 is disposed to face the hydrophilic plate 1200 on the opposite side of the heat transfer plate 1100. The hydrophobic plate 1300 may be disposed to be in close contact with the hydrophilic plate 1200. The hydrophobic plate 1300 may be formed of a material that is both hydrophobic and porous. Working fluid may flows through the side opposite to the side of the hydrophobic plate 1300 facing the hydrophilic plate 1200. In this case, pores are formed in the hydrophobic plate 1300. The working fluid is able to pass through the pores and, in the present embodiment, air is able to pass through the pores.

The hydrophobic plate 1300 is formed of a membrane material, and may be provided in the form of a film or a sheet and disposed on the hydrophilic plate 1200. Alternatively, the hydrophobic plate 1300 may be manufactured by coating a hydrophobic material on the hydrophilic plate 1200. In this case, since the hydrophobic plate 1300 is formed to have a thin thickness, evaporation performance in the hydrophobic plate 1300 may be further improved, and thermal conductivity to the heat transfer plate 1100 may also be improved.

The water supply device 1400 is a device for supplying water W and the like to the hydrophilic plate 1200. The water supply device 1400 may receive water W from an external water supply source, and supply water W to the hydrophilic plate 1200. In this case, the hydrophilic plate 1200 may absorb and temporarily store the water W supplied from the water supply device 1400. As the external water supply source, a water tank (not shown) in which water W is stored or water supply facilities may be used. A flow rate control device (not shown) for controlling the flow rate of supplied water W may be disposed in the water supply device 1400.

Additionally, a mesh member 1700 may be disposed on the hydrophobic plate 1300.

The mesh member 1700 is disposed to face the hydrophobic plate 1300, and may be disposed on the opposite side of the heat transfer plate 1100. The mesh member 1700 may be disposed in close contact with the hydrophobic plate 1300. The mesh member 1700 is for holding and fixing the hydrophobic plate 1300. The mesh member 1700 is formed to include a plurality of holes in a grid form or a mesh form. Working fluid is able to pass through the holes of the mesh member 1700 and, in the present embodiment, air is able to pass through the holes of the mesh member 1700. The mesh member 1700 may be formed of a stainless material, or may have a water-repellent coating on the surface thereof. In this case, durability may be maintained even when the mesh member 1700 is in direct contact with water.

The first module M1 and the second module M2 have the same configuration except for the arrangement structure. The second module M2 may have the same configuration as the first module M1, and may be arranged by turning the same configuration as the first module M1 upside down. In one evaporation module M, the first module M1 and the second module M2 are disposed to face each other.

In each evaporation module M, a first flow path 1500 through which working fluid WF flows is formed between the first module M1 and the second module M2. An outlet of the first flow path 1500 may communicate with an outdoor space, and an inlet of the first flow path 1500 may communicate with the outdoor space or an indoor space. The working fluid WF may be air. The working fluid WF may be outdoor air, and, in some cases, may be indoor air.

In one evaporation module M, the first module M1 and the second module M2 may be disposed to be spaced apart from each other. In this case, the hydrophobic plates 1300 of the first module M1 and the second module M2 may be spaced apart from each other and disposed to face each other. Due to this, the first flow path 1500 is formed between the hydrophobic plates 1300.

The working fluid WF may pass through the pores of the hydrophobic plate 1300 while flowing through the first flow path 1500. Accordingly, the working fluid WF may meet the water W temporarily stored in the hydrophilic plate 1200, and the water W may be then evaporated by the working fluid WF. In this process, the working fluid WF is cooled by losing as much heat as the latent heat of evaporation of water W.

A second flow path 1600 through which cooling target fluid OF flows is formed between any two evaporation modules M adjacent to each other. An Inlet and outlet of the second flow path 1600 may communicate with the indoor space. That is, the cooling target fluid OF is all introduced from the indoor space and discharged into the indoor space, and the cooling target fluid OF may be water W or air.

Two adjacent evaporation modules M constituting the second flow path 1600 may be spaced apart from each other. In this case, the heat transfer plate 1100 of the first module M1 and the heat transfer plate 1100 of the second module M2 may be disposed at the outermost sides of the evaporation module M, respectively. In this case, the second flow path 1600 may be formed between the heat transfer plate 1100 of one evaporation module M and the heat transfer plate 1100 of another evaporation module M adjacent to the one evaporation module M.

The cooling target fluid OF of the second flow path 1600 is cooled through heat exchange with the working fluid WF cooled in the first flow path 1500. In this case, heat exchange may be performed through the heat transfer plate 1100. Accordingly, the cooling target fluid OF is discharged through the outlet of the second flow path 1600 while being in a cooled state.

The first flow path 1500 and the second flow path 1600 may be formed in directions crossing each other. That is, the flow direction of the working fluid WF in the first flow path 1500 may cross the flow direction of the cooling target fluid OF in the second flow path 1600. In this case, there is an advantage that heat transfer between the working fluid WF and the cooling target fluid OF can be made more effectively.

In the above and below, it has been described that water W is supplied to the hydrophilic plate 1200 through the water supply device 1400, and the water W supplied to the hydrophilic plate 1200 meets the working fluid WF in the hydrophobic plate 1300 and is evaporated. However, this is only an example of the indirect evaporative cooling apparatus 1000 according to the present disclosure, and in some cases, the water W supplied from the water supply device 1400 to the hydrophilic plate 1200 may be replaced with another liquid fluid that is evaporable. For example, the water W supplied from the water supply device 1400 to the hydrophilic plate 1200 may be replaced with a fluid such as ethanol in a liquid state. In this case, the liquid fluid is supplied to the hydrophilic plate 1200, and the liquid fluid supplied to the hydrophilic plate 1200 meets the working fluid WF in the hydrophobic plate 1300 and is evaporated.

In addition, in the above and below, it has been described that the working fluid WF may be air, and the cooling target fluid OF may be water or air. However, this is only an example of the indirect evaporative cooling apparatus 1000 according to the present disclosure, and the working fluid WF or the cooling target fluid OF may be replaced with another fluid.

Specifically, the working fluid WF may be replaced with another gaseous fluid capable of evaporating a liquid fluid such as water W supplied from the water supply device 1400 to the hydrophilic plate 1200. In addition, the cooling target fluid OF may be replaced with another fluid in a liquid state or a gaseous state, which is capable of being subjected to exchange heat with the working fluid WF through the heat transfer plate 1100.

According to an embodiment, in the first module (M1) and the second module (M2) of one evaporation module (M), or the first module (M1) and the second module (M2) adjacent to each other in different evaporation modules M, the first module (M1) and the second module (M2) may be spaced apart from each other by the water supply device 1400. Specifically, the water supply device 1400 of the first module (M1) may support at least one of the heat transfer plate 1100, the hydrophilic plate 1200, and the hydrophobic plate 1300 of the first module (M1) and the water supply device 1400 of the second module (M2) supports at least one of the heat transfer plate 1100, the hydrophilic plate 1200 and the hydrophobic plate 1300 of the second module (M2). As shown in FIG. 1, the water supply device 1400 of the first module (M1) and the water supply device 1400 of the second module (M2) are stacked on each other, so that the first module (M1) and the second module (M2) may be spaced apart from each other.

For example, the heat transfer plate 1100, the hydrophilic plate 1200, the hydrophobic plate 1300 and the mesh member 1700 of the first module (M1) may be fixed to each other by screws or the like, and the heat transfer plate 1100 may be fixed to the water supply device 1400 through welding or the like. The heat transfer plate 1100, the hydrophilic plate 1200, the hydrophobic plate 1300 and the mesh member 1700 of the second module (M2) may be also fixed to each other, and the heat transfer plate 1100 may be fixed to the water supply device 1400.

The water supply devices 1400 of the first module M1 and the second module M2 stacked on each other may be disposed at the edges of each module. For example, as shown in FIG. 1, the water supply devices 1400 of the first module M1 and the second module M2 each include a plurality of water supply members 1410, and the plurality of water supply members 1410 may be disposed at the edges of each module. As described above, as the water supply devices 1400 of the first module M1 and the second module M2, each having a predetermined height while supporting the plates of each module, are stacked on each other, the evaporation module M may be stably fixed and supported.

In this case, a water supply flow path 1420 through which water supplied from the outdoor space flows may be formed inside each water supply member 1410. In particular, in the present embodiment, when the water supply members 1410 of the evaporation modules are stacked on each other, all the water supply flow paths 1420 of the stacked water supply members 1410 may communicate with each other. That is, the water supply flow paths 1420 of the stacked water supply members 1410 are all connected to form a single flow path individually extending from the edges of the cooling apparatus 1000. In this case, even when water is supplied to only one water supply member 1410 among the water supply members 1410 stacked on each other, the water may be supplied to all the water supply members 1410 stacked on each other. When the water supply devices 1400 of the evaporation modules are stacked in the gravity direction, the water supplied to the water supply member 1410 located at the uppermost among the water supply members 1410 stacked on each other may flow downward by gravity.

The hydrophilic plate 1200 of each evaporation module may be exposed to the water supply flow path 1420 of each evaporation module. When the hydrophilic plate 1200 is exposed to the water supply flow path 1420, the hydrophilic plate 1200 may come into contact with the water flowing through the water supply flow path 1420, and thus be smoothly provided with water. To this end, a protrusion 1210 protruding toward the water supply flow path 1420 may be formed in the hydrophilic plate 1200. When the protrusion 1210 is formed in the hydrophilic plate 1200, the hydrophilic plate 1200 may be in direct contact with water of the water supply passage 1420.

The hydrophobic plate 1300 of each evaporation module may be spaced apart from the water supply flow path 1420 of each evaporation module. When the hydrophobic plate 1300 is spaced apart from the water supply flow path 1420, the hydrophobic plate 1300 may be blocked from water flowing through the water supply flow path 1420. In this case, a leak prevention member may be disposed between the hydrophobic plate 1300 and the water supply flow path 1420. The leak prevention member may seal the hydrophobic plate 1300 against the water supply flow path 1420 to block the hydrophobic plate 1300 while the hydrophobic plate 1300 is being spaced apart from the water supply flow path 11420. In the present embodiment, as shown in FIG. 4, the leak prevention member 1800 is provided between the adjacent hydrophobic plate 1300 and the mesh member 1700. In this case, the leak prevention member 1800 may be stably fixed to the hydrophobic plate 1300 by the mesh member 1700. In some cases, the leak prevention member 1800 may be replaced with a sealing means such as an O-ring or an adhesive.

In this case, as shown in FIG. 5, pores 1310 of the hydrophobic plate 1300 may be formed to have a size such that water W, absorbed by the hydrophilic plate 1200, is unable to pass through the pores 1310 of the hydrophobic plate 1300 by the surface tension, while the working fluid WF is able to pass through the pores 1310 of the hydrophobic plate 1300. To this end, the maximum radius (r) of the pores 1310 of the hydrophobic plate 1300 is preferably determined to satisfy the equation $$r \le \frac{2\sigma}{\rho g H},$$

where σ is the surface tension coefficient of water, ρ is the density of water, g is the acceleration of gravity, H is the height of the cooling apparatus 1000. Here, as shown in FIG. 1, the height of the cooling apparatus 1000 may correspond to the total height of the stacked water supply devices 1400. For example, when the height of the cooling apparatus 1000 is 2 m and the surface tension coefficient of water is 0.072 N/m, the maximum radius (r) of the pores 1310 may be 7.354 μm or less.

In addition, since the pressure of water W increases as a position in the cooling apparatus 1000 is lowered, the lower a position of the hydrophobic plate, the smaller the radius (r) of the pores of the hydrophobic plate when the height (H) of the cooling apparatus is fixed according to an embodiment. For example, when the hydrophobic plate 1300 is installed parallel to the ground, the radius (r) of the pores 1310 may be smaller as the hydrophobic plate is closer to the ground. When the hydrophobic plate 1300 is perpendicular to the ground, the radius (r) of the pores 1310 may be smaller as the pores 1310 of one hydrophobic plate are closer to the ground.

Hereinafter, an indirect evaporative cooling system 2000 according to a first embodiment of the present disclosure will be described in detail with reference to FIG. 6. An indirect evaporative cooling system 2000 according to a first embodiment of the present disclosure may include the indirect evaporative cooling apparatus 1000 according to the first embodiment of the present disclosure, a first pipe 2100, and a second pipe 2200, a third pipe 2300, and a fourth pipe 2400.

The indirect evaporative cooling apparatus 1000 is disposed in the indoor (I) space. The first pipe 2100 may be a pipe having an inlet communicating with the outdoor (O), and an outlet communicating with an inlet of a first flow path 1500. That is, outdoor (O) air is introduced into the inlet of the first pipe 2100, and outdoor (O) air introduced into the first pipe 2100 is discharged through the outlet and flows into the first flow path 1500.

The second pipe 2200 may be a pipe having an inlet communicating with an indoor (I) space and an outlet communicating with the inlet of the second flow path 1600. That is, the indoor (I) space air is introduced into the inlet of the second pipe 2200, and the indoor (I) space air introduced into the second pipe 2200 is discharged through the outlet and flows into the second flow path 1600.

The third pipe 2300 may be a pipe having an inlet communicating with the outlet of the second flow path 1600 and an outlet communicating with the indoor (I) space. That is, the cooled indoor (I) air (cooling target fluid OF which has been cooled) discharged from the outlet of the second flow path 1600 may flow into the inlet of the third pipe 2300, and the indoor (I) space air introduced into the third pipe 2300 may be discharged through the outlet and supplied to the indoor space.

The fourth pipe 2400 may be a pipe having an inlet communicating with the outlet of the first flow path 1500 and an outlet communicating with the outdoor (O) That is, outdoor (O) air (working fluid WF that has undergone the evaporation process of water) discharged through the outlet of the first flow path 1500 is introduced into the inlet of the fourth pipe 2400, and outdoor (O) air introduced to into the fourth pipe 2400 may be discharged to the outdoor (O) through the outlet.

Figure 7:
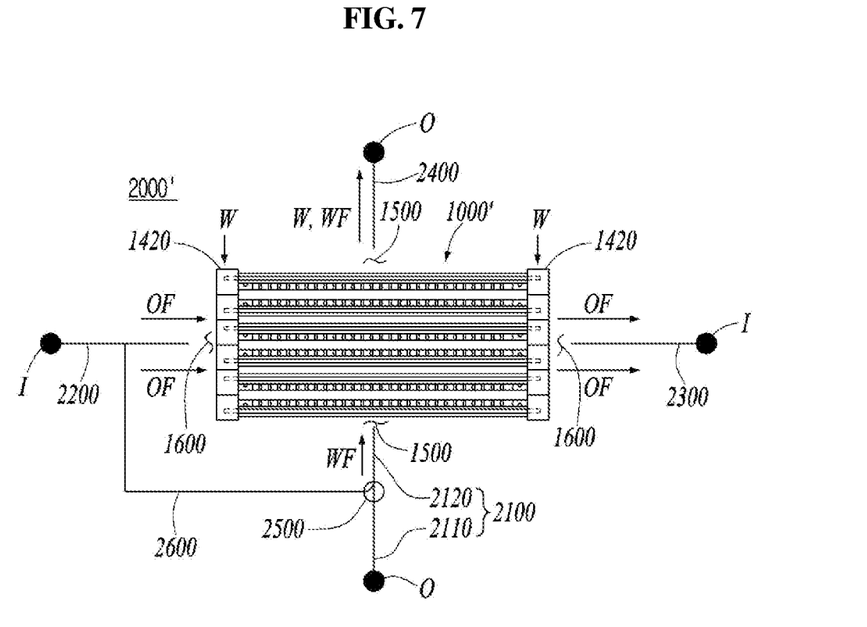
FIG. 7 is a conceptual diagram illustrating an indirect evaporative cooling apparatus according to a second embodiment of the present disclosure and a cooling system including the same.

FIG. 7 is a conceptual diagram illustrating an indirect evaporative cooling apparatus according to a second embodiment of the present disclosure and a cooling system including the same; and Referring to FIG. 7, an indirect evaporative cooling apparatus 1000' according to a second embodiment of the present disclosure will be described. Since the configuration of the indirect evaporative cooling apparatus 1000' according to the second embodiment of the present disclosure is identical to the configuration of the indirect evaporative cooling apparatus 1000 according to the first embodiment of the present disclosure, except for the first flow path 1500 and the second flow path 1600, a detailed description thereof will be omitted.

In the indirect evaporative cooling apparatus 1000' according to the second embodiment of the present disclosure, air from the indoor (I) space may be introduced through the inlet of the first flow path 1500. In this case, indoor (I) air introduced through the inlet of the first flow path 1500 may be what a part of the indoor (I) air to be introduced into the second flow path 1600 has been bypassed.

When the working fluid WF introduced into the first flow path 1500 is humid outdoor (O) air, cooling efficiency is reduced because evaporation in the first flow path 1500 cannot be smoothly performed. In order to prevent such a decrease in cooling efficiency, fluid in a relatively dry state may need to be introduced into the first flow path 1500. In general, even when the outdoor (O) air is humid, the indoor (I) air may be maintained in a drier state than the outdoor (O) air. Accordingly, when relatively dry indoor (I) air is introduced into the first flow path 1500 instead of humid outdoor (O) air, a decrease in cooling efficiency of the cooling apparatus 1000' is prevented even when the outdoor (O) environment is humid.

Hereinafter, a cooling system 2000' including an indirect evaporative cooling apparatus 1000' according to the second embodiment of the present disclosure will be described with reference to FIG. 7. Since the configuration of the cooling apparatus 2000' according to the second embodiment of the present disclosure is identical to the configuration of the cooling apparatus 2000 according to the first embodiment of the present disclosure, except for the first flow path 2100 and the second flow path 2200, a detailed description thereof will be omitted.

The cooling system 2000' according to a second embodiment of the present disclosure may include the indirect evaporative cooling apparatus 1000' according to the second embodiment of the present disclosure, a first pipe 2100, and a second pipe 2200, a third pipe 2300, a fourth pipe 2400, a first switching device 2500, and a first bypass tube 2600.

The first pipe 2100 may include a 1-1-th pipe 2110 and a 1-2-th pipe 2120. The inlet of the 1-1-th pipe 2110 may communicate with the outdoor (O), and the outlet of the 1-1-th pipe 2120 may communicate with the inlet of the first flow path 1500. The first switching device 2500 is disposed between the 1-1-th pipe 2110 and the 1-2-th pipe 2120. That is, the first switching device 2500 is arranged to connect the outlet of the 1-1-th pipe 2110 and the inlet of the 1-2-th pipe 2120 to each other.

The first bypass pipe 2600 is disposed between the second pipe 2200 and the first switching device 2500. That is, the inlet of the first bypass pipe 2600 may communicate with the second pipe 2200, and the outlet of the first bypass pipe 2600 may communicate with the first switching device 2500.

The first switching device 2500 may communicate at least one of the outlet of the 1-1-th pipe 2110 and the outlet of the first bypass pipe 2600 selectively or both the outlets with the inlet of the first 1-2 pipe 2120. When the outlet of the 1-1-th pipe 2110 communicates with the inlet of the 1-2-th pipe 2120, only outdoor (O) air is introduced into the first pipe 2100, and the working fluid WF flowing through the first flow path 1500 may contain only outdoor (O) air. On the other hand, when the first bypass pipe 2600 communicates with the inlet of the 1-2-th pipe 2120, the working fluid WF flowing through the first flow path 1500 may contain only indoor (I) air. In addition, when both the 1-1-th pipe 2110 and the first bypass pipe 2600 communicate with the inlet of the 1-2-th pipe 2120, the working fluid WF flowing through the first flow path 1500 may be air in which outdoor (O) air and indoor (I) air are mixed. As described above, when the indoor (I) air flows through the first flow path 1500, a decrease in the cooling efficiency of the cooling apparatus 1000' can be prevented as described above, although the outdoor (O) air is humid.

Figure 8:
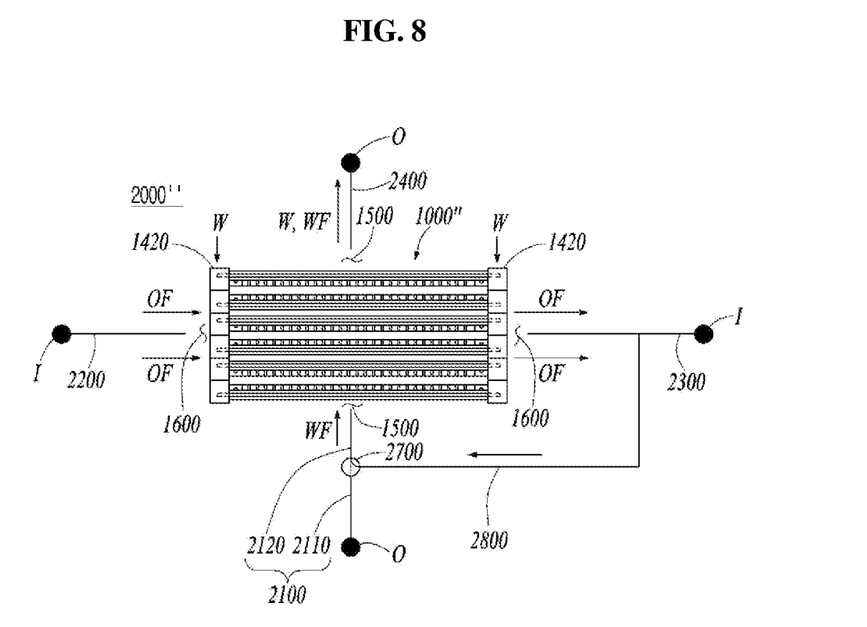
FIG. 8 is a conceptual diagram illustrating an indirect evaporative cooling apparatus according to a third embodiment of the present disclosure and a cooling system including the same.

FIG. 8 is a conceptual diagram illustrating an indirect evaporative cooling apparatus according to a third embodiment of the present disclosure and a cooling system including the same.

Hereinafter, an indirect evaporative cooling apparatus 1000" according to a third embodiment of the present disclosure will be described with reference to FIG. 8. Since the configuration of the indirect evaporative cooling apparatus 1000" according to the third embodiment of the present disclosure is identical to the configuration of the indirect evaporative cooling apparatus 1000 according to the first embodiment of the present disclosure, except for the first flow path 1500 and the second flow path 1600, a detailed description thereof will be omitted.

In the indirect evaporative cooling apparatus 1000" according to the third embodiment of the present disclosure, cooling target fluid OF discharged from the second flow path 1600 may be introduced through the inlet of the first flow path 1500. In this case, at least a portion of working fluid WF in the first flow path 1500 may contain the cooling target fluid OF discharged from the second flow path 1600.

When the working fluid WF introduced into the first flow path 1500 is high-temperature outdoor (O) air, the heat transfer tube 1100 may not be sufficiently cooled even if an evaporation process occurs in the first flow path 1500. Therefore, even when the outdoor (O) air is at a high temperature, at least a portion of the indoor (I) air that has been already subjected to a cooling process by passing through the second flow path 1600 may be forced to flow into the first flow path 1500, so that the overall temperature of the working fluid WF is lowered, thus sufficiently cooling the heat transfer tube 1100. In addition, when the working fluid WF introduced into the first flow path 1500 contains only humid outdoor (O) air, the cooling efficiency may be deteriorated because evaporation in the first flow path 1500 cannot be smoothly performed. In order to prevent such a decrease in cooling efficiency, as in the indirect evaporative cooling apparatus 1000' according to the second embodiment of the present disclosure, relatively dry indoor (I) air may be used as the working fluid WF.

Hereinafter, a cooling system 2000" including the indirect evaporative cooling apparatus 1000" according to the third embodiment of the present disclosure will be described in detail with reference to FIG. 8. Since the configuration of the cooling apparatus 2000" according to the third embodiment of the present disclosure is identical to the configuration of the cooling apparatus 2000 according to the first embodiment of the present disclosure, except for the first flow path 2100 and the third flow path 2300, a detailed description thereof will be omitted.

The cooling system 2000" according to the third embodiment of the present disclosure may include the indirect evaporative cooling apparatus 1000" according to the third embodiment of the present disclosure, a first pipe 2100, and a second pipe 2200, a third pipe 2300, a fourth pipe 2400, a second switching device 2700, and a second bypass tube 2800.

The first pipe 2100 may include a 1-1-th pipe 2110 and a 1-2-th pipe 2120. The inlet of the 1-1-th pipe 2110 may communicate with the outdoor (O), and the outlet of the 1-1-th pipe 2120 may communicate with the inlet of the first flow path 1500. The second switching device 2700 is disposed between the 1-1-th pipe 2110 and the 1-2-th pipe 2120. That is, the second switching device 2700 is arranged to connect the outlet of the 1-1-th pipe 2110 and the inlet of the 1-2-th pipe 2120 to each other.

The second bypass pipe 2800 may be disposed between the third pipe 2300 and the second switching device 2700. That is, the inlet of the second bypass pipe 2800 communicates with the third pipe 2300, and the outlet of the second bypass pipe 2800 communicates with the second switching device 2700.

The first switching device 2700 may communicate at least one of the outlet of the 1-1-th pipe 2110 and the outlet of the second bypass pipe 2800 selectively or both the outlets with the inlet of the first 1-2 pipe 2120. When the outlet of the 1-1-th pipe 2110 communicates with the inlet of the 1-2-th pipe 2120, only outdoor (O) air is introduced into the first pipe 2100, and the working fluid WF flowing through the first flow path 1500 may contain only outdoor (O) air. On the other hand, when the outlet of the second bypass pipe 2800 communicates with the inlet of the 1-2-th pipe 2120, the working fluid WF flowing through the first flow path 1500 may contain only indoor (I) air which has been subjected to the cooling process by passing through the second flow path 1600. In addition, when both the outlet of the 1-1-th pipe 2110 and the outlet of the second bypass pipe 2800 communicate with the inlet of the 1-2-th pipe 2120, the working fluid WF flowing to the inlet of the first flow path 1500 may contain outdoor (O) air and indoor (I) air. As described above, it is possible to further cool outdoor (O) air, and also to prevent a decrease in the cooling efficiency of the cooling apparatus 1000" even when the outdoor (O) air is humid.

While the exemplary embodiments of the present disclosure have been illustrated and described above, the present disclosure is not limited to the aforementioned specific exemplary embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present invention.

The present disclosure relates to an indirect evaporative cooling apparatus and a cooling system including the same, and more particularly, to an indirect evaporative cooling apparatus including a plurality of evaporation modules each including a first module and a second module, and a cooling system including the same.

What is claimed is:

1. An indirect evaporative cooling apparatus comprising a plurality of evaporation modules each of which comprises a first module and a second module disposed to face the first module,
wherein each of a plurality of first modules and a plurality of second modules comprises:
a heat transfer plate configured to provide heat transfer;
a hydrophilic plate disposed to face the heat transfer plate and formed of a porous material capable of absorbing water;
a hydrophobic plate disposed to face the hydrophilic plate on an opposite side of the heat transfer plate and having pores, working fluid flowing through the hydrophobic plate on a side opposite to a side facing the hydrophilic plate; and
a water supply device configured to supply water to the hydrophilic plate,
wherein in each of the evaporation modules, a first flow path through which the working fluid flows is formed between the first module and the second module,
wherein a second flow path through which a cooling target fluid flows is formed between two of the evaporation modules adjacent to each other.

2. The indirect evaporative cooling apparatus of claim 1, wherein, in each of the evaporation modules,
the hydrophobic plate of the first module and the hydrophobic plate of the second module are disposed to face each other, and
the heat transfer plate of the first module and the heat transfer plate of the second module are respectively disposed at outermost sides of the evaporation module.

3. The indirect evaporative cooling apparatus of claim 1, wherein in each of the evaporation modules, the first module and the second module are disposed to be spaced apart from each other.

4. The indirect evaporative cooling apparatus of claim 3, wherein the first module and the second module are arranged to be spaced apart from each other by the water supply device of the first module and the water supply device of the second module.

5. The indirect evaporative cooling apparatus of claim 4,
wherein the water supply device of the first module is configured to support at least one of the heat transfer plates, the hydrophilic plate, and the hydrophobic plate of the first module, and the water supply device of the second module is configured to support at least one of the heat transfer plate, the hydrophilic plate, and the hydrophobic plate,
and wherein the water supply device of the first module and the water supply device of the second module are stacked on each other.

6. The indirect evaporative cooling apparatus of claim 1, wherein in each of the evaporation modules, the water supply device of the first module and the water supply device of the second module each include a water supply member having a water supply flow path formed therein,
wherein the hydrophilic plate of the first module is exposed to the water supply flow path of the first module, and the hydrophilic plate of the second module is exposed to the water supply flow path of the second module,
wherein the hydrophobic plate of the first module is spaced apart from the water supply flow path of the first module, and the hydrophobic plate of the second module is spaced apart from the water supply flow path of the second module.

7. The indirect evaporative cooling apparatus of claim 6, wherein each of the hydrophilic plates comprises a protrusion formed in the each hydrophilic plate and protruding toward the water supply flow path.

8. The indirect evaporative cooling apparatus of claim 6, wherein the water supply member of the first module and the water supply member of the second module are stacked on each other, and the water supply flow path of the first module and the water supply flow path of the second module communicate with each other.

9. The indirect evaporative cooling apparatus of claim 1, wherein each of the plurality of first modules and the plurality of second modules further comprises a mesh member which is disposed to face the hydrophobic plate on an opposite side of the heat transfer plate, and through which the working fluid is able to pass.

10. The indirect evaporative cooling apparatus of claim 9, wherein a leak prevention member is provided between the mesh member adjacent thereto and the hydrophobic plate.

11. The indirect evaporative cooling apparatus of claim 1, wherein the first flow path and the second flow path are formed in directions crossing each other.

12. The indirect evaporative cooling apparatus of claim 1, wherein a plurality of pattern protrusions is formed on a surface of each of the plurality of hydrophilic plates.

13. The indirect evaporative cooling apparatus of claim 1, wherein a maximum radius (r) of the pores of the hydrophobic plate satisfies equation $r \leq 2\sigma/\rho gH$, where $\sigma$ is a surface tension coefficient of water, $\rho$ is a density of water, g is an acceleration of gravity, H is a height of the cooling apparatus.

14. The indirect evaporative cooling apparatus of claim 13, wherein, when the height (H) of the cooling apparatus is fixed, the lower a position of the hydrophobic plate, the smaller the radius (r) of the pores of the hydrophobic plate.

15. The indirect evaporative cooling apparatus of claim 1, wherein the working fluid is air, and the outlet of the first flow path communicates with an outdoor space, and
and wherein the cooling target fluid is water or air, and an inlet and an outlet of the second flow path communicate with an indoor space.

16. The indirect evaporative cooling apparatus of claim 15,
wherein a portion of indoor air is introduced into the second flow path,
and wherein a remaining portion of the indoor air is introduced to the first flow path.

17. The indirect evaporative cooling apparatus of claim 15,
wherein indoor air flows through the second flow path, and
wherein at least a portion of the indoor air discharged from the second flow path is introduced to the first flow path.

18. An indirect evaporative cooling system comprising:
the cooling apparatus of claim 1;
a first pipe having an inlet communicating with an outdoor space and an outlet communicating with an inlet of the first flow path;
a second pipe having an inlet communicating with an indoor space and an outlet communicating with an inlet of the second flow path;
a third pipe having an inlet communicating with an outlet of the second flow path, and an outlet communicating with the indoor space; and
a fourth pipe having an inlet communicating with the outlet of the first flow path, and an outlet communicating with an outdoor space.

19. The indirect evaporative cooling system of claim 18,
wherein the first pipe comprises an 1-1-th pipe having an inlet communicating with the outdoor space, and an 1-2-th pipe having an outlet communicating with the inlet of the first flow path,
wherein the second pipe is connected to a bypass pipe that branches a portion of a fluid,
wherein a first switching apparatus is disposed between an outlet of the 1-1-th pipe, an inlet of the 1-2-th pipe, and the bypass pipe,
and wherein the first switching apparatus is configured to selectively communicate the 1-2-th pipe with the 1-1-th pipe or the bypass pipe.

20. The indirect evaporative cooling system of claim 18,
wherein the first pipe comprises a 1-1-th pipe having an inlet communicating with the outdoor space, and a 1-2-th pipe having an outlet communicating with the inlet of the first flow path,
wherein the third pipe is connected to a bypass pipe that branches a portion of a fluid,
wherein a second switching apparatus is disposed between an outlet of the 1-1-th pipe, an inlet of the 1-2-th pipe, and the bypass pipe, and
wherein the second switching apparatus is configured to selectively communicate the 1-2-th pipe with the 1-1-th pipe or the bypass pipe.

\* \* \* \* \*